United States Patent [19]

Sarbach

[11] Patent Number: 5,571,432
[45] Date of Patent: Nov. 5, 1996

[54] HEATING AND VENTILATING APPARATUS FOR THE CABIN OF A MOTOR VEHICLE HAVING A PROPULSION MOTOR WITH RELATIVELY LOW HEAT LOSS

[75] Inventor: Jean-Charles Sarbach, Les Essarts Le Roi, France

[73] Assignee: Valeo Thermique Habitacle, Le Mesnil-Saint-Denis, France

[21] Appl. No.: 49,954

[22] Filed: Apr. 20, 1993

[30] Foreign Application Priority Data

Apr. 21, 1992 [FR] France ................................ 92 04859

[51] Int. Cl.$^6$ ............................................... B60L 1/02
[52] U.S. Cl. ................................ 219/202; 219/504; 219/530; 392/360; 392/379
[58] Field of Search ........................ 219/202, 504, 219/505, 530, 540; 392/347, 360, 365–369, 379, 383–385, 502, 480, 473

[56] References Cited

U.S. PATENT DOCUMENTS

| Re. 31,841 | 3/1985 | Madsen et al. | 392/480 X |
|---|---|---|---|
| 3,067,311 | 12/1962 | Lacy-Hulbert | 392/502 X |
| 3,313,915 | 4/1967 | Chamberlain | 219/202 X |
| 3,476,293 | 11/1969 | Marcoux | 219/504 X |
| 3,666,924 | 5/1972 | Jensen et al. | 219/505 X |
| 3,737,622 | 6/1973 | Hallgreen | 219/505 |
| 4,045,763 | 8/1977 | Miyamoto et al. | 219/504 |
| 4,459,466 | 7/1984 | Nakagawa et al. | 219/367 |
| 4,477,715 | 10/1984 | Bell et al. | 219/505 X |
| 4,604,516 | 8/1986 | Metz | 219/504 |
| 5,057,672 | 10/1991 | Bohlender et al. | 219/540 |
| 5,239,163 | 8/1993 | Brouwers | 392/379 X |
| 5,256,857 | 10/1993 | Curhan et al. | 392/360 X |

FOREIGN PATENT DOCUMENTS

| 882310 | 9/1971 | Canada | 219/505 |
|---|---|---|---|
| 0204393 | 12/1986 | European Pat. Off. . | |
| 0243077 | 10/1987 | European Pat. Off. . | |
| 0275720 | 2/1988 | European Pat. Off. . | |
| 2597222 | 10/1987 | France . | |
| 3113545 | 10/1982 | Germany | 392/371 |
| 2053628 | 5/1990 | Japan . | |

*Primary Examiner*—Teresa J. Walberg
*Assistant Examiner*—Raphael Valencia
*Attorney, Agent, or Firm*—Morgan & Finnegan, LLP

[57] ABSTRACT

A heating and ventilating apparatus for a motor vehicle having either an internal combustion engine or an electric propulsion motor, where the heat given off by the engine or motor is insufficient to provide heating requirements for the cabin of the vehicle under all conditions, comprises an air inlet chamber associated with a blower, and an air outlet chamber which feeds at least one outlet duct, leading to the cabin. A heating branch is interposed between the inlet chamber and the outlet chamber, with heating means arranged in the air heating branch. The heating means comprise a radiant heater having pure or passive resistance, together with a radiant electric heater having a positive temperature co-efficient resistance, the two heaters being connected electrically in series in a circuit which is supplied by a voltage source.

5 Claims, 1 Drawing Sheet

HEATING AND VENTILATING APPARATUS FOR THE CABIN OF A MOTOR VEHICLE HAVING A PROPULSION MOTOR WITH RELATIVELY LOW HEAT LOSS

FIELD OF THE INVENTION

This invention relates to heating and ventilating apparatus for the cabin of a motor vehicle, in particular one of the kind having a propulsion motor or engine which has a relatively low heat loss. In particular, the invention is concerned with an apparatus of the type comprising an air inlet chamber having an air blower, an air outlet chamber feeding at least one outlet duct which leads into the cabin, an air heating branch interposed between the air inlet chamber and the air outlet chamber, and heating means contained in the air heating branch.

BACKGROUND OF THE INVENTION

In general terms, an apparatus of this type also includes an air transmission branch which is interposed between the air inlet chamber and the air outlet chamber, together with a regulating valve which is arranged to distribute an air stream between the air heating branch and the air transmission branch.

Arrangements of this type are already known, which are suitable for installation in either a vehicle having an internal combustion engine, or an electrically propelled motor vehicle. Where the vehicle has an internal combustion engine, the heating means of the heating and ventilating apparatus conventionally comprise a heat exchanger which is fed with engine coolant liquid heated by the engine, with an air stream passing through the heat exchanger and being delivered into the cabin. Heating of the cabin is thus obtained by recovering at least some of the heat given off by the engine.

In modern motor vehicles having internal combustion engines, the power which is available in the engine cooling circuit is becoming more and more restricted as a result of continued improvement in engine efficiency. The heat losses are often, in consequence not sufficiently large to provide effective heating, especially in cold weather. In the case of an electrically propelled vehicle which is powered from an electrical voltage source carried by the vehicle, that is to say batteries, the motor has hardly any useful heat loss.

For this reason, such vehicles are currently heated either by means of a burner, or by means of one or more electrical heating resistances which are fed by the batteries, and through which an air stream is delivered into the cabin of the vehicle by a blower. These resistors, which can be referred to as "pure resistors" or "passive resistors", give rise to thermal safety problems due to the fact that, when the flow of air is stopped, the power of the resistors is unable to be dissipated in the form of heat. This gives rise to risks of fire by melting, followed by combustion of the plastics materials located in the vicinity of the resistors. In order to overcome this drawback, it is necessary to provide a temperature detector which controls a suitable electronic power regulating device, so that all of the heat is delivered at a low temperature, the power being interrupted at high temperature, for example at temperatures greater than 120° C.

In addition, these known types of heating resistor have the disadvantage that they have a high electric power consumption; and since this power is taken from the batteries, the autonomy of the vehicle (that is to say its scope for travelling independently) is thereby restricted.

It has recently been proposed to use heating resistors of the positive temperature co-efficient (PTC) type, that is to say resistors in which there is a very great variation in the value of the resistance as a function of temperature. This is by contrast with pure or passive resistors, the resistance of which remains practically constant regardless of the temperature.

In PTC resistors, the resistance value increases very sharply beyond a temperature threshold referred to as the "critical" or "transition" temperature. They have the advantage of being auto-adjustable for temperature, so that the electrical power adjusts itself to a working temperature which is almost constant in the running mode. The use of a positive temperature co-efficient heating resistor thus enables the electric power consumed to be adapted to the desired thermal power, without the need to provide any additional control means. On the other hand, PTC resistors have the disadvantage that their resistance is low on starting when the temperature is very low, for example at −20° C. As a result, under these conditions there is an abnormally high electric current through the resistor, due to the very low value of the resistance of the external electric circuit (i.e. the battery and appropriate electrical connections). This very high current can be dangerous, even if it occurs only over a very short period of time.

DISCUSSION OF THE INVENTION

A principal object of the invention is to overcome the various drawbacks mentioned above.

Another object of the invention is to provide a heating and ventilating apparatus which is suitable most particularly for motor vehicles having propulsion units of low heat loss.

A further object of the invention is to provide such an apparatus which can be used not only in a motor vehicle having an internal combustion engine, but also one having an electric propulsion motor.

Yet another object of the invention is to provide an apparatus of the type defined above which is very safe in operation.

According to the invention, heating and ventilating apparatus for the cabin of a motor vehicle having a propulsion motor with relatively low heat loss, the said apparatus being of the type comprising an air inlet chamber having an air blower, an air outlet chamber feeding at least one outlet duct which leads into the cabin, an air heating branch interposed between the air inlet chamber and the air outlet chamber, and heating means contained in the air heating branch, is characterised in that the heating means comprise an electric radiant heater having pure or passive resistance, together with a further electric radiant heater having a positive temperature co-efficient of resistance, the two said heaters being connected electrically in series with each other in an electrical circuit supplied with power from a voltage source.

In this way the invention enables the current to be limited at very low operating temperatures, for example at about −20° C., because it is then the pure or passive resistor that provides substantially all of the load resistance. In addition, the invention enables the current at high operating temperatures, for example at about 122° C., to be limited due to the effects produced by the positive temperature co-efficient of resistance. In this connection, the electrical power involved adjusts itself for a working temperature which is very nearly constant under running conditions, so that there is an automatic limiting effect.

According to a preferred feature of the invention, the pure resistance heater and the heater having positive temperature co-efficient of resistance are disposed in series in the air heating branch, so that an air stream flows through them in succession.

According to another preferred feature of the invention, the value of the positive temperature co-efficient resistance is so selected as to be substantially constant over a first range of temperature, and so that its value increases very sharply over a second range of temperatures, above a critical temperature, and such that the operating temperature of the apparatus lies close to the said critical temperature.

It is thus arranged that the operating temperature of the heater with positive temperature co-efficient of resistance is close to its critical or transition threshold temperature. Thus when the temperature of the air entering the apparatus becomes reduced, any excessively sudden drop in the resistance, that would give rise to a large increase in the power consumed, is avoided.

In one form of apparatus according to the invention, the pure resistance radiant heater and the heater with positive temperature co-efficient of resistance radiator are grouped together in a single heating unit which includes at least one heat exchange body, at least one pure resistor, at least one positive temperature co-efficient resistor, an electrical connection between the pure resistor and the positive temperature co-efficient resistor or resistors, and electrical connections for connecting the pure resistor and the positive temperature co-efficient resistor or resistors to the voltage source.

Preferably, the said heating unit comprises three heat exchange bodies, namely two end heat exchange bodies and an intermediate heat exchange body, with the said bodies variously flanking, firstly the said pure resistor or resistors and secondly the said positive temperature co-efficient resistor or resistors.

According to another preferred feature of the invention, the end heat exchange body and the intermediate heat exchange body, which together flank the positive temperature co-efficient resistor or resistors, constitute, in common, current input elements for the said positive temperature co-efficient resistor or resistors.

The voltage source which supplies the apparatus may be a battery carried on the vehicle where the latter has an electric propulsion motor. If the propulsion unit of the vehicle is an internal combustion engine, the power source is typically an alternator driven by the engine.

In the description of a preferred embodiment of the invention which follows, and which is given by way of example only, reference is made to the accompanying drawings.

DESCRIPTION OF A PREFERRED
EMBODIMENT OF THE INVENTION

Figure 1:
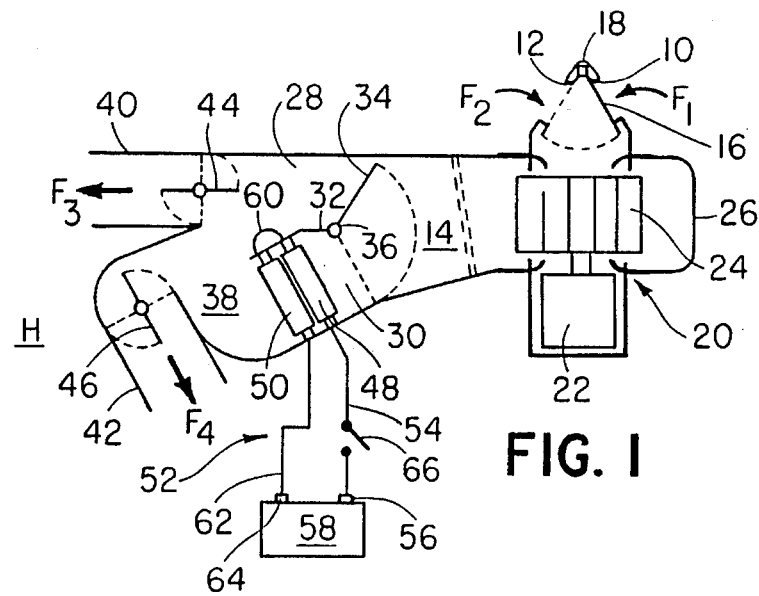
FIG. 1 is a diagrammatic representation of a heating and ventilating apparatus in accordance with the invention.

The heating and ventilating apparatus shown diagrammatically in FIG. 1 includes an admission port 10 for fresh air drawn from outside the cabin H of a motor vehicle, together with an admission port 12 for recycled air taken from inside the cabin H, as indicated by the arrows $F_1$ and $F_2$ respectively. The admission ports 10 and 12 are open into an air inlet chamber 14 which is part of the apparatus according to the present invention. An air inlet valve 16 is mounted for pivoting movement about an axis 18, and enables the air inlet chamber 14 to be supplied either with fresh air (with the valve in the position shown in broken lines), or with recycled air when the valve is in the position shown in a full line, or by a mixture of fresh air and recycled air. A motorised blower unit 20 is mounted in the air inlet chamber, and comprises an electric motor 22 which drives a blower 24 in rotation. The blower 24 is mounted in a volute chamber 26 which leads into the air inlet chamber 14.

The outlet end of the air inlet chamber 14 is open into two branches in parallel, namely an air transmission branch 28 and an air heating branch 30. The branches 28 and 30 are separated from each other by a wall 32, and a regulating valve 34 (which is referred to in the rest of this description as a mixing valve) is mounted for rotation about an axis 36 upstream of the wall 32, so that the distribution of the air stream between the two branches 28 and 30 can be adjusted by this valve.

The two branches 28 and 30 rejoin downstream of the wall 32, in air outlet chamber 38 in which the air streams leaving the two branches 28 and 30 can themselves rejoin and mix together. The chamber 38 feeds two outlet ducts 40 and 42. In this example, the outlet duct 40 is arranged to supply one or more outlet ports (not shown) arranged on the fascia of the vehicle, while the outlet duct 42 is arranged to supply one or more outlet ports (again not shown), which are directed into the lower part of the cabin of the vehicle. The ducts 40 and 42 are controlled by a valve 44 and a valve 46 respectively.

As described so far, the general structure of the apparatus is known per se.

The air heating branch 30 contains two electric resistant heaters 48 and 50. The electric heater 48 includes one or more conventional electrical heating resistors, that is to say pure or passive resistors, in which the value of resistance is substantially constant with variation in temperature. On the other hand, the other electric heater, 50, contains at least one electric resistor of the positive temperature co-efficient (PTC) kind.

The heater 48 and 50 are connected in series in an electric circuit 52 which includes an electrical connection 54 connecting the heater 48 to one of the poles, 56, of a battery 58, another electrical connection 60 which connects the two heaters 48 and 50 together, and a further electrical connection 62 which connects the heater 50 to the other pole 64 of the battery 58. The connection 54 also includes an interruptor 66 for opening and closing the circuit 52, so as to control the electrical supply to the electric heaters 48 and 50.

In the example shown, the heaters 48 and 50 are arranged in series inside the air heating branch 30. Again as shown by way of example only, the heater 48 is here disposed upstream of the heater 50 with reference to the direction of flow of the airstream, although it will of course be understood that the opposite arrangement is equally passable. When the heaters 48 and 50 are connected to their electrical supply, the air flowing in the branch 30 is thereby heated. The mixing valve 34 enables the air stream to be distributed in a known manner between the air transmission branch 28 and the air heating branch 30, so as to adjust the temperature of the air delivered through the outlet ducts 40 and 42.

As has already been mentioned above, the heater 48 comprises at least one conventional resistor which has a substantially constant value of resistance regardless of the temperature, while the heater 50 includes at least one positive temperature co-efficient resistor. The use of resistors of this type in domestic heating apparatus is already known, for example from the specification of European published Patent Application EP204393A.

Figure 2:
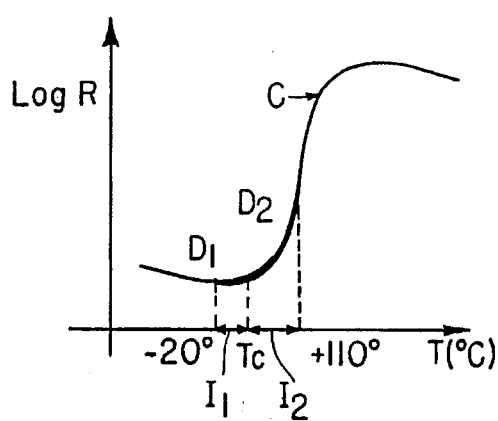
FIG. 2 is a graph showing the variation in the value of a PTC heating resistor as a function of the temperature of the resistor.

In a resistive device of the PTC type, the resistance varies as a function of temperature in the manner shown in FIG. 2, in which a curve C shows the variation of the logarithm of the resistance (Log R) as a function of the temperature T, which is here expressed in degrees C. Over a first temperature range $I_1$, the curve C comprises a first part $D_1$ in which the resistance is substantially constant. This is followed by a second part $D_2$ of the curve, in which the resistance increases very sharply with temperature. The ranges $I_1$ and $I_2$ of the curve lie respectively below and above a threshold temperature which corresponds to a critical temperature $T_c$. It is of particular importance to choose the part of the curve in which the resistors are to operate, in such a way that this operating part of the curve lies close to the critical temperature.

The pure resistance heater 48 is preferably situated upstream of the PTC resistance heater 50, this is not essential to the operation of the apparatus. The stream of air which has been heated by the heater 48 raises the temperature of the PTC resistance heater 50, and this enhances the limitation effect. The same effect may however be obtained by arranging the pure resistor or resistors and the PTC resistor or resistors in a single unit which thus combines a pure resistance heater with a PTC resistance heater.

In this connection, reference will now be made to FIG. 3, which shows a typical heating unit 68 embodying this principle. In the unit 68 in FIG. 3, a pure resistance heater 70 and a PTC resistance heater 72 are grouped together in the same structure. The unit 68 includes three heat exchange bodies, namely two end bodies 74 and 76 and an intermediate body 78. The heater 70 is surrounded, or flanked, by the bodies 74 and 78, while the heater 72 surrounded, or flanked, by the bodies 76 and 78.

The end heat exchange body 74 comprises a succession of fins 80 arranged in accordion fashion and supported between two bars 82 and 84. In the same way, the other outer heat exchange body 76 comprises a succession of accordion fins 86 supported between two bars 88 and 90. Similarly, the intermediate heat exchange body 78 comprises a succession of accordion fins 92 supported between two bars 94 and 96. In this example, the heater 70 comprises a single pure or passive resistor 98, which is arranged inside a tube 100 which is filled with a suitable electrical insulating material; while the heater 72 here comprises three positive temperature co-efficient resistors 102$_1$, 102$_2$ and 102$_3$. The assembly constructed as described above is carried by a support frame 104.

The outer heat exchange body 76 and the intermediate heat exchange body 78 both act as current input elements for the positive temperature co-efficient resistors 102$_1$ to 102$_3$.

Figure 3:
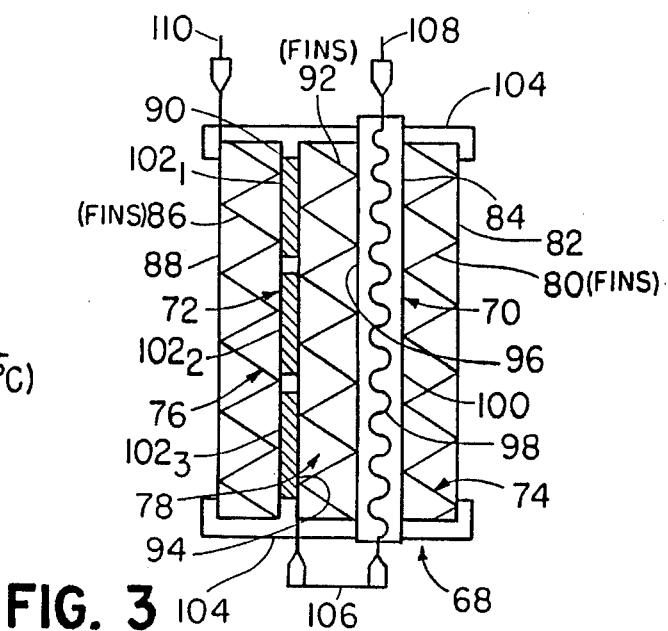
FIG. 3 is a diagrammatic cross sectional view showing one apparatus in which an electric heater having a pure resistor and an electric heater with a PTC resistor are grouped together.

The heating unit 68 shown in FIG. 3 also includes: an electrical connection 106 which connects the pure resistor 98 to the intermediate heat exchange body 78; and another electrical connection 108 which connects a suitable source of voltage (not shown) to the outer heat exchange bodies 76; and a further electrical connection 110 which connects the same voltage source to the pure resistor 98. The unit 68 is preferably so disposed that the air stream first flows through the pure resistor and them through the PTC resistors.

Since the apparatus described above includes a conventional electrical resistance heater together with heater having a positive temperature co-efficient of resistance, it has the following advantages. First, when the temperature is very low, for example around −20° C., the value of the resistance of the PTC resistor is very low, so that the load resistance is provided substantially entirely by the passive resistor. In this way, the abnormally high electrical current that would be produced if positive temperature co-efficient resistor were used on its own is avoided.

In addition, if the operating temperature becomes high, for example around 120° C., the load resistance is then provided substantially entirely by the positive temperature co-efficient resistor, which has a high resistance under these conditions. In this way, the current is limited and the power consumed is also limited. Under these conditions, the apparatus provides automatic limitation of the intensity of current flowing through the two types of resistor, both at low temperatures and at high temperature. In addition, it automatically limits the electrical power consumed, under conditions of maximum safety.

The apparatus may also include, if necessary, a temperature sensor for detecting the electrical supply to the resistors in the case of any irregular situation.

In the apparatus described above, the electrical source which supplies the heaters 48 and 50 is a direct current battery 58. Such an apparatus is thus particularly suitable in the case of an electric motor vehicle having high tension batteries for the power supply to the electric propulsion motor.

The apparatus can also be used in a vehicle propelled by an internal combustion engine, in which case the electrical source is a high tension alternator driven by the engine of the vehicle in the usual way. The automatic limitation facility provided by the apparatus enables electrical consumption to be adapted at all times to the requirements of the system without imposing an undue penalty on the autonomy of the vehicle.

What is claimed is:

1. Heating and ventilating apparatus for the cabin of a motor vehicle having a propulsion motor with relatively low heat loss, said apparatus comprising: air inlet means; an air blower associated with said air inlet means; air outlet means; at least one air outlet connected with the air outlet means downstream of the latter, and open into the cabin of the vehicle; an air heating branch connecting the air inlet means to the air outlet means; and heating means arranged in the air heating branch, the apparatus further having an electrical circuit and a voltage source connected to said circuit for supplying the circuit with power, said heating means having a first electrical resistance heater and a second electrical resistance heater connected electrically in series in said circuit, said first heater having a substantially constant temperature coefficient of resistance and said second heater having a positive temperature coefficient of resistance, wherein said first and second heaters are arranged with said first heater being upstream of the second heater in the air heating branch, so that air flow through the air heating branch passes successively over them, a heating unit which includes both said first and second heaters in combination, at least three heat exchange bodies in the heating unit, namely two end heat exchange bodies and an intermediate heat exchange body arranged between the two end bodies with at least one resistor of said first heater being flanked by the intermediate heat exchange body and one of said end bodies and at least one resistor of said second heater being flanked by the intermediate body and the other end body.

2. Apparatus according to claim 1, wherein the electrical resistance of the second heater is such that its value is substantially constant over a first temperature range and increases very sharply in a second temperature range above a pre-determined critical temperature, the apparatus being arranged to operate at an operating temperature close to the said critical temperature.

3. Apparatus according to claim 1, wherein said intermediate body constitutes said first electrical connection and said end bodies together constitute said second electrical connection.

4. Apparatus according to claim 1, wherein the voltage source is a battery carried by the vehicle.

5. Apparatus according to claim 1, wherein the voltage source is an alternator carried by the vehicle and coupled to the engine of the vehicle so as to be driven thereby.

\* \* \* \* \*